US008363067B1

(12) United States Patent
Massicotte et al.

(10) Patent No.: US 8,363,067 B1
(45) Date of Patent: Jan. 29, 2013

(54) PROCESSING MULTIPLE REGIONS OF AN IMAGE IN A GRAPHICS DISPLAY SYSTEM

(75) Inventors: Marc-Antoine Massicotte, Laval (CA); Christian Toutant, Montreal (CA); Stephane Tremblay, St-Joseph-du-Lac (CA)

(73) Assignee: Matrox Graphics, Inc., Dorval, Quebec (CA)

( * ) Notice: Subject to any disclaimer, the term of this patent is extended or adjusted under 35 U.S.C. 154(b) by 786 days.

(21) Appl. No.: 12/366,474

(22) Filed: Feb. 5, 2009

(51) Int. Cl.
*G09G 5/22* (2006.01)
(52) U.S. Cl. .......... 345/642; 345/660; 345/581
(58) Field of Classification Search .......... 345/642, 345/581, 660
See application file for complete search history.

(56) References Cited

U.S. PATENT DOCUMENTS

| | | | |
|---|---|---|---|
| 4,894,653 A | 1/1990 | Frankenbach | |
| 4,958,374 A * | 9/1990 | Tokita et al. | 382/149 |
| 4,992,955 A * | 2/1991 | Yabuuchi et al. | 345/428 |
| 5,339,159 A | 8/1994 | Nakamura et al. | |
| 5,396,257 A | 3/1995 | Someya et al. | |
| 5,402,148 A * | 3/1995 | Post et al. | 345/698 |
| 5,485,203 A | 1/1996 | Nakamura et al. | |
| 5,517,253 A * | 5/1996 | De Lange | 348/513 |
| 5,539,431 A | 7/1996 | Nishioka et al. | |
| 5,557,302 A * | 9/1996 | Levinthal et al. | 345/546 |
| 5,610,630 A * | 3/1997 | Nakamura et al. | 715/788 |
| 5,632,002 A * | 5/1997 | Hashimoto et al. | 704/231 |
| 5,668,569 A | 9/1997 | Greene et al. | |
| 5,694,560 A * | 12/1997 | Uya et al. | 715/781 |
| 5,757,364 A * | 5/1998 | Ozawa et al. | 345/539 |
| 5,781,174 A * | 7/1998 | Uya et al. | 345/639 |
| 5,838,396 A | 11/1998 | Shiota et al. | |
| 6,020,868 A | 2/2000 | Greene et al. | |
| 6,271,825 B1 | 8/2001 | Greene et al. | |
| 6,292,157 B1 | 9/2001 | Greene et al. | |
| 6,456,339 B1 | 9/2002 | Surati et al. | |
| 6,490,364 B2 * | 12/2002 | Hanna et al. | 382/107 |
| 6,525,772 B2 | 2/2003 | Johnson et al. | |
| 7,002,606 B2 | 2/2006 | Tanaka et al. | |
| 7,038,727 B2 | 5/2006 | Majumder et al. | |
| 7,336,392 B2 | 2/2008 | Kakutani | |
| 2003/0152160 A1 * | 8/2003 | Bauch et al. | 375/295 |
| 2004/0066978 A1 * | 4/2004 | Nanbu | 382/261 |
| 2005/0140613 A1 | 6/2005 | Lowe et al. | |
| 2005/0253777 A1 | 11/2005 | Zehner et al. | |

FOREIGN PATENT DOCUMENTS

EP 000482746 A2 * 4/1992

* cited by examiner

*Primary Examiner* — Javid A Amini
(74) *Attorney, Agent, or Firm* — Norton Rose Canada LLP

(57) ABSTRACT

There is described a method and circuit for independently processing a plurality of regions of an image to be displayed on a display device. The circuit comprises a plurality of transformation modules; a multiplexer having a plurality of inputs and an output for selectively transmitting one of the output values from one of the plurality of transformation modules, and a selector line; and a selection module operatively connected to the selector line of the multiplexer and configured to determine a position of the pixel in the image and identify a transformation module corresponding to a region with a highest priority level for a pixel position, and cause the multiplexer to output the output value from the identified transformation module as the post-transformation pixel for display on the display device.

24 Claims, 7 Drawing Sheets

PROCESSING MULTIPLE REGIONS OF AN IMAGE IN A GRAPHICS DISPLAY SYSTEM

CROSS-REFERENCE TO RELATED APPLICATIONS

This is the first application filed for the present invention.

TECHNICAL FIELD

The present invention relates to the field of graphics display systems, and more particularly, to the application of transformations to regions of an image before display.

BACKGROUND OF THE INVENTION

Today computer systems are more efficient and may be used in a variety of new fields such as medicine, video surveillance etc. In these fields, users make more use of the display device than before for extracting relevant information. Most operating systems running on computer systems provide multi-application environments to the user, meaning that a user may use a plurality of applications simultaneously. In general, a user can have multiple applications running where each application has at least one window open on a single desktop displayed on a single display device. In a simple example, a doctor or a technician analyzing X-Rays on a monitor may have a first set of windows of a medical application open with X-ray images, another window open with a Word™ document, and a window with Acrobat Reader™. In most operating systems, a single window is selected as being active and is placed in the forefront of the screen, the other windows being in the background.

In this context, each window is independent and may display a different type of data. It may be desired to apply a certain transformation, such as a given contrast or a gamma correction, to the data displayed in one window, without affecting the data displayed in the other windows. For example, in order to make an accurate diagnosis and analysis the user may need to apply a transformation on the window including the X-Ray images without modifying the data displayed in the other windows (e.g. Word™ document or Acrobat Reader™ document). Furthermore, the user may want to open a plurality of images and perform a different transformation on each image to highlight different characteristic of the image.

These types of transformations are typically done in a graphics processing system or by software. Graphics processing systems are configured to apply a same transformation to an entire image displayed on a single screen. This does not allow one window to be treated independently from the other windows. Software applications may process data for each window independently but this is done in a non-efficient manner requesting a huge amount of processing time from the central processing unit of a computer system that cannot process other crucial tasks in the meantime.

There is a need to develop a system and method that would allow each window in a multi-window environment to be treated independently such that transformations may be applied to a single window without affecting other windows.

SUMMARY OF THE INVENTION

There is described herein a circuit for applying different transformations on regions of an image that is output by a graphics processing system for display.

In accordance with a first broad aspect of the present invention, there is provided a circuit for independently processing a plurality of regions of an image to be displayed on a display device, the circuit comprising: a plurality of transformation modules, each one of the transformation modules having an input for receiving a pixel of the image and an output for transmitting an output value, each one of the transformation modules determining the output value for the pixel after a given transformation has been applied; a multiplexer having a plurality of inputs, each one of the inputs being connected to a corresponding output of the plurality of transformation modules, an output for selectively transmitting one of the output values from one of the plurality of transformation modules, and a selector line; and a selection module operatively connected to the selector line of the multiplexer and configured to determine a position of the pixel in the image and identify which ones of the plurality of regions the position corresponds to, each one of the regions associated with a priority level, the selection module identifying a transformation module corresponding to a region with a highest priority level for a pixel position and causing the multiplexer to output the output value from the identified transformation module as the post-transformation pixel for display on the display device.

In accordance with a second broad aspect of the present invention, there is provided a method for independently processing a plurality of regions of an image to be displayed on a display device, the method comprising: receiving a pixel forming part of the image in a plurality of transformation modules; outputting from the plurality of transformation modules an output value for the pixel after a given transformation has been applied; determining, in a hardware selection module, a position of the pixel and identifying which ones of the plurality of regions the position corresponds to, and identifying a transformation module associated with a region corresponding to a highest priority level for a pixel position; and transmitting the output of the transformation module associated with the region corresponding to the highest priority level to a display device by multiplexing the outputs from the plurality of transformation modules using the selection module as a selector signal.

In accordance with a third broad aspect of the present invention, there is provided a method for independently processing a plurality of regions of an image to be displayed on a display device, the method comprising: defining a new region of the image; recording the new region in a list of regions to be processed by a transformation application circuit and providing region parameters corresponding to the new region in the transformation application circuit; monitoring changes in the region parameters; and updating the transformation application circuit for processing the new region according to the changes in the region parameters.

In this specification, the terms "surface" and "video surface" are meant to refer to a set of pixels intended for display together on a display device where each pixel is associated with a set of color components. The term "image" refers to a surface which is formatted for display. In general, image data is output from a graphics processing system as a formatted set of pixels and each pixel is associated to a plurality of attributes such as color components and Alpha value. An Alpha value may indicate the transparency of a pixel. Color components of a pixel may be represented in a variety of color spaces. RGB, YUV, YCbCr or grayscale are examples of color spaces. Color components may have different formats. For example, if data is represented in an RGB color space, the three color components may include 8 bits of data each, 10 bits or 13 bits of data each, etc. Alternatively, the red color component may include 8 bits of data while the two other components, green and blue, may include 10 bits of data. One may note that for each color space there may be different color component formats for the various color components. A display device can be a screen, a display monitor, etc. A graphics processing system generates images for display. It may include a dedicated processor (graphics processor), a display engine, a graphics memory, an interface and other components.

The term "priority level" is a ranking associated to each region of an image to determine the order of priority when a pixel is present in more than one region. A region is a subset of pixels comprised in an image. There may be overlap between the regions, since a pixel may belong to two different regions. Each region is associated with an ID. A "transformation" refers to any operation applied on a color component of a pixel. For example, for a set of pixels, the transformation may be a thresholding, where color components above a threshold value are not modified and all color components below the threshold value are modified.

The term "transformation module" is used to embody a look-up table or an arithmetic circuit that performs a transformation on a color component of a pixel.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION

Figure 1:
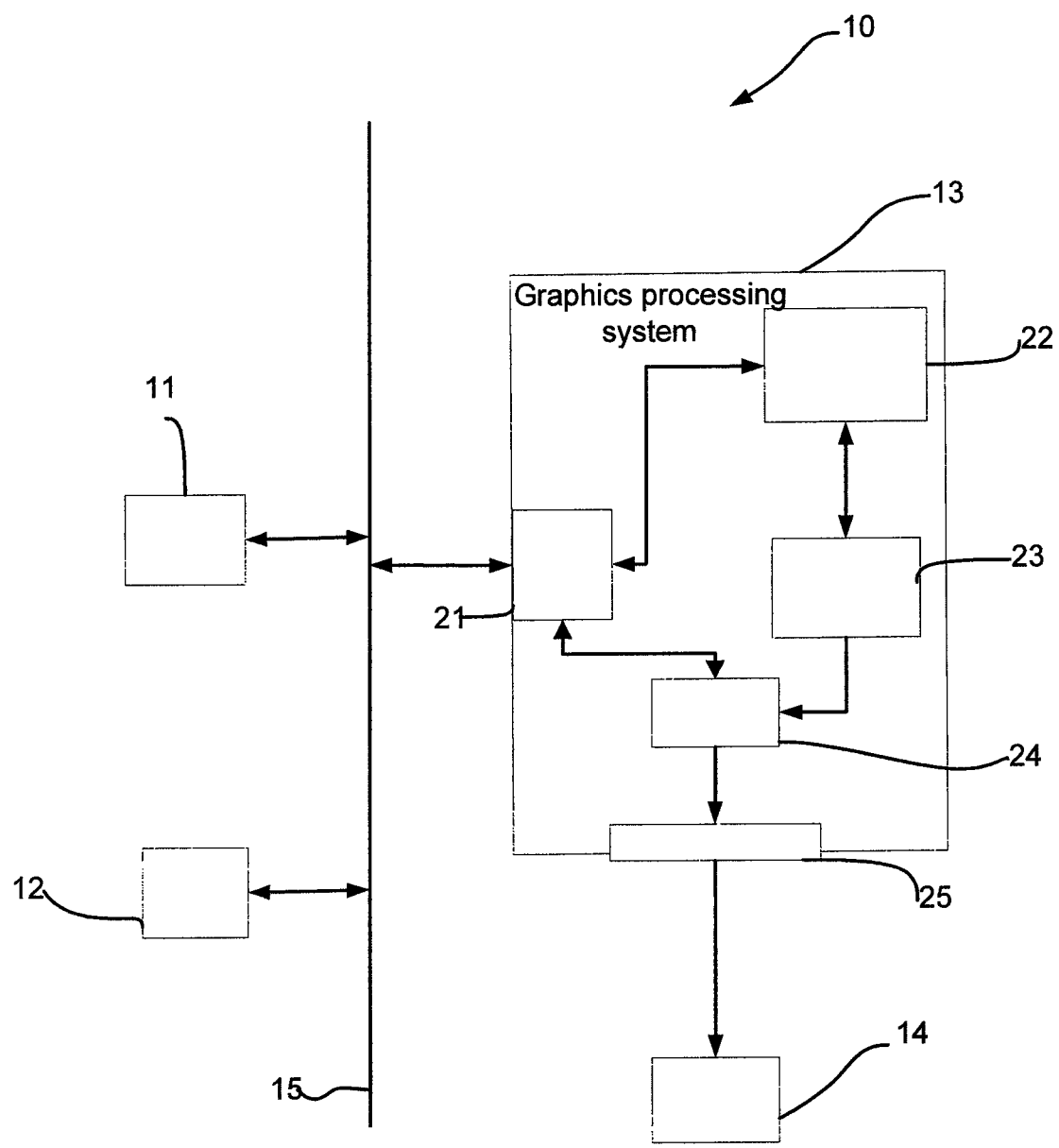
FIG. 1 illustrates a system including a graphics processing system as per the prior art.

FIG. 1 illustrates a circuit for providing an image to a display device from a graphics processing system (i.e. graphics chip or graphics processing unit), as per the prior art. A graphics processing system 13 may include an interface 21, a graphics processor 22, a video memory 23, a display controller 24, and an output port 25. The video memory 23, which may be external to the graphics processing system, stores instructions and data sent by an application running on a central processing unit 11. It may also store intermediate data while it is being processed in the graphics processor or may store processed data once the processing is complete. In general, the interface 21 is used to connect the graphics processing system 13 to the central processing unit 11 and memory 12 through the bus 15. The graphics processor 22 may receive data and instructions through the interface 21. Once processed, data is stored in the video memory 23 as a surface and is output by the display controller 24 to the display device 14. The display controller 24 may receive control data through interface 21, and may be configured by a driver to output a surface from the video memory 23 through the output port 25, to format the surface according to the monitor's parameters (ex. device resolution, refresh rate, etc) such that it includes all synchronization signals. These parameters may be defined at an initialization step, when the system 10 is switched on, or they may be defined by a user at any moment during the system's run time. A surface provided from the output port 25 may be referred to as an image because the surface is formatted by the display controller to be suitable for display on a display device. In some graphics processing systems, there may be a plurality of display controllers.

There is described herein, in one embodiment, a transformation application circuit that may be used for independently applying different transformations to pixels of an image that are output by a graphics processing system and sent to a display device, as a function of the position of the pixel in the image. Each pixel may belong to a plurality of regions of the image and each region may need to be processed according to a different transformation, the transformation being a linear or non-linear function. In one embodiment, the transformations are stored in hardware look-up tables and are selectively applied to pixels in accordance with the pixel's position in the image. In other embodiments, the functions are implemented using arithmetic units and are selectively applied to pixels in accordance with the pixel's position in the image.

Figure 2:
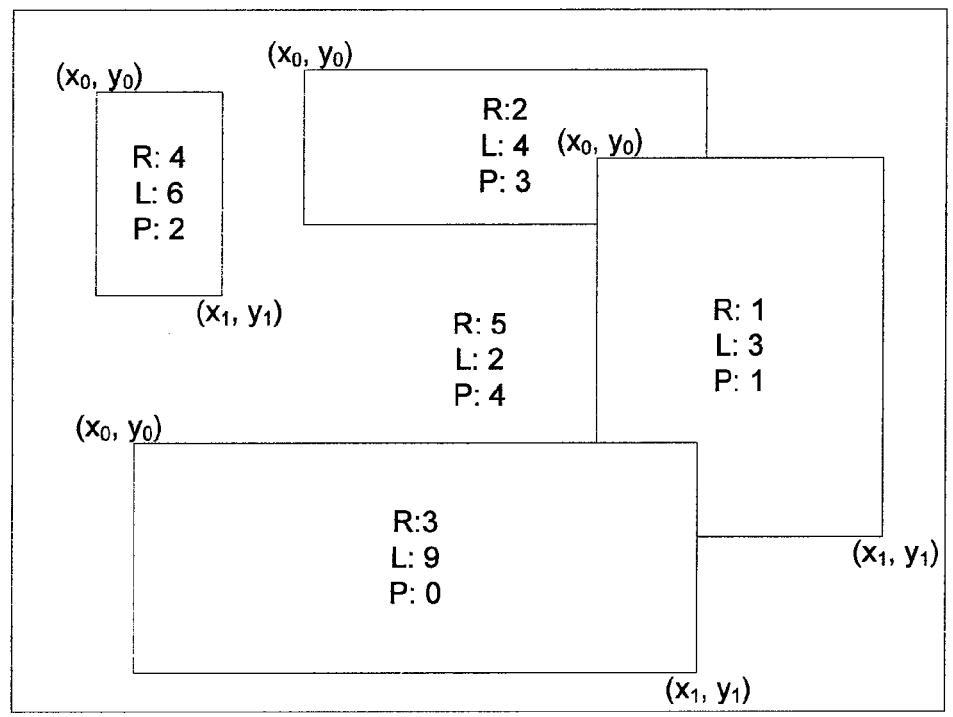
FIG. 2 illustrates a display device with an image having multiple regions therein, in accordance with one embodiment.

FIG. 2 illustrates a display device 14 displaying an image forming a desktop or a part of the desktop and having multiple regions defined thereon, each region corresponding to a set of pixels. According to this embodiment, each region has an ID (R), an associated transformation (L), and a priority level (P). The ID permits identification of the region. The transformation may be determined automatically by the application to which the region belongs or may be selected by a user from a set of proposed transformations. The priority level ranks the regions such that when a pixel is part of more than one region, the transformation corresponding to the region with the highest priority level is selected and applied to the pixel before being displayed.

As shown in FIG. 2 for regions 1 and 2 and regions 1 and 3, some pixels may be part of multiple regions. In this case, region 3 has priority over region 1, and region 1 has priority over region 2. In this example, the region that is in the foreground on the desktop is given the highest priority level (i.e. priority 0). Each region is a finite set of pixels where each pixel has a position (x,y) in a 2D coordinate system of the desktop. Therefore, a pixel position within an image (which is a part of the desktop) may be used to determine which region it is included in. In the example illustrated in FIG. 2, each region is a rectangle and may be defined using the coordinates $(x_0, y_0)$ of the top left corner and the coordinates $(x_1, y_1)$ of the bottom right corner of the rectangle.

Figure 3:
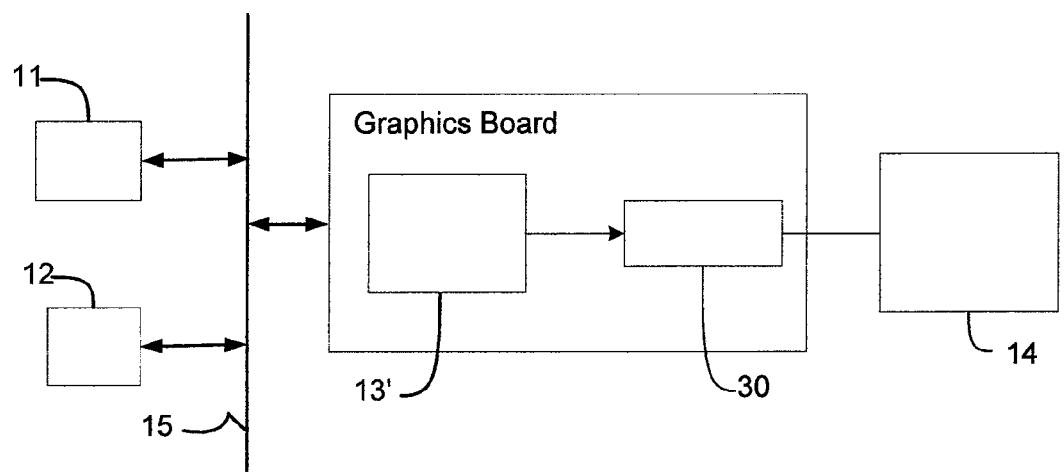
FIG. 3 illustrates the system of FIG. 1 with a transformation application circuit therein, in accordance with one embodiment.

FIG. 3 illustrates the system of FIG. 1, with a transformation application circuit 30 provided between the graphics processing system 13' and the display device 14. An image is received by the circuit 30, the image comprising a plurality of pixels. The transformation application circuit 30 applies transformations to the incoming pixels. At least one transformation is associated with at least one region of the image. The position of each pixel is determined and an appropriate region is selected. The transformation corresponding to the selected region is identified by selecting a proper transformation module included in the transformation application circuit. The post-transformation pixel corresponding to an applied transformation by the selected transformation module to the incoming pixel is then transmitted to the display device 14 or to a processing unit for further processing of the pixel before being displayed on the display device.

Figure 4:
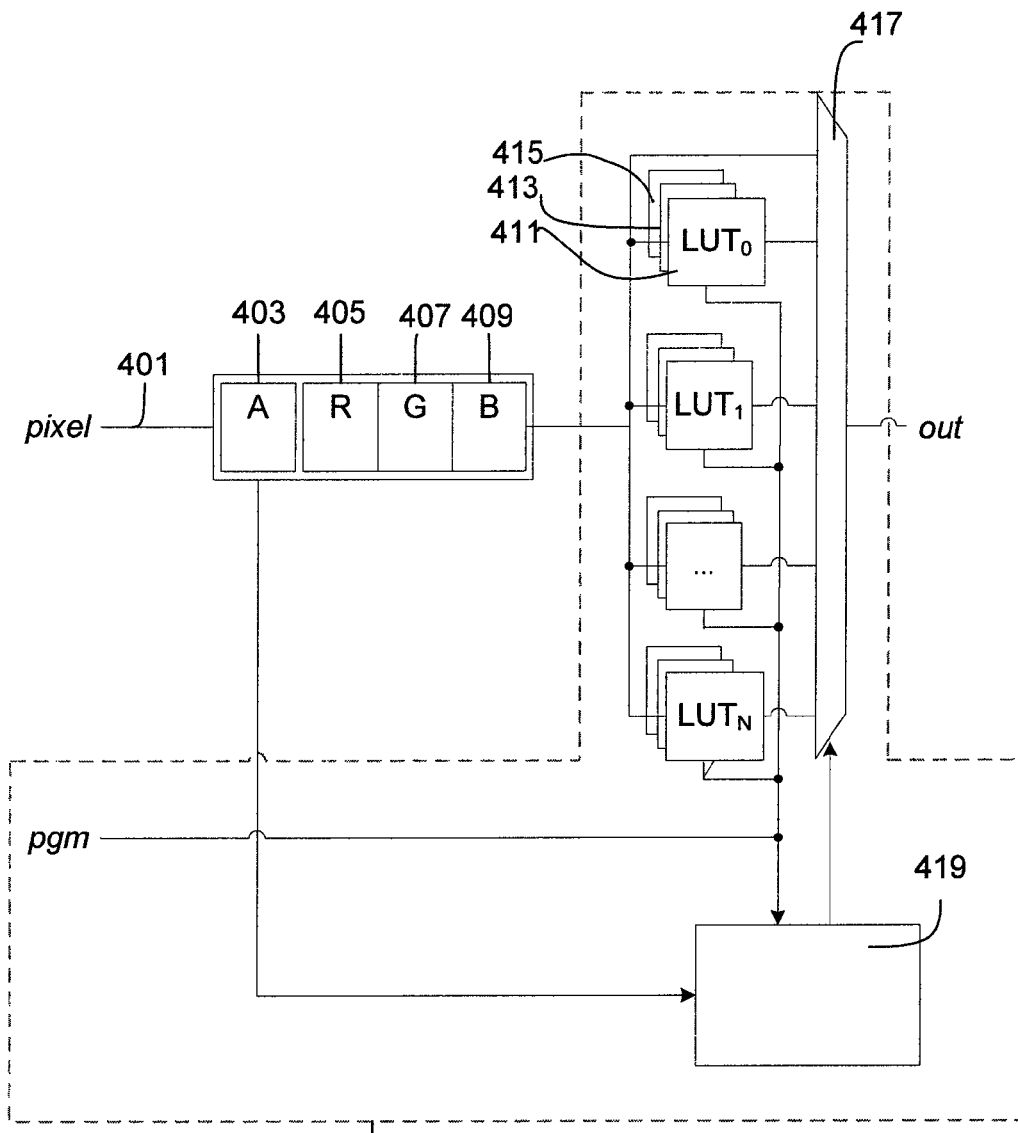
FIG. 4 illustrates the transformation application circuit in more detail, in accordance with one embodiment.

FIG. 4 illustrates an embodiment of the transformation application circuit 30. In this embodiment, a plurality of look-up tables is provided in hardware as transformation modules to apply transformations to the incoming pixels. Each look up table includes elements of a transformation. A sample format of a row in a look-up table is as follows:

An Element of the Transformation each look-up table including a plurality of rows and each row is accessed using an index value.

The look-up tables, which are arrays or matrices of data that contain items that are searched, may be implemented in various ways in hardware. They may be arranged as key-value pairs, where the keys are the data items being searched (looked up) and the values are either the actual data or pointers to where the data are located. In some cases, lookup tables contain only data items (just values, not key-value pairs). In one example, memory blocks are used to implement look up tables. In digital logic, an n-bit lookup table can be implemented with a multiplexer whose select lines are the inputs of the look-up table and whose inputs are constants. An n-bit look-up table can encode any n-input Boolean function by modeling such functions as truth tables.

In some embodiments, each one of the plurality of look up tables is a memory block which includes N locations to store N elements of a transformation. Each element of the transformation may be represented with m binary elements (i.e., bits). In accordance with other embodiments, the number of locations included in the look up tables may differ from one look up table to the other.

In accordance with various embodiments, the look up tables may be configured to process a plurality of different formats of surfaces. In one embodiment, the look up tables may be configured to process a plurality of pixels in an RGB color space and may be grouped in sets of three look up tables. As shown in FIG. 4, the transformation application circuit may include N sets of three look up tables. In each set of three look up tables, a first look up table may be configured to include elements of a transformation to process a first color component of the plurality of pixels. A second look up table may be configured to include elements of the same transformation to process a second color component of the same plurality of pixels. A third look up table may be configured to include elements of the same transformation to process a third color component of the same plurality of pixels. For example, the blue component of the plurality of pixels may be processed using the first look up table 411, the green component of the pixels may be processed using the second look up table 413 and the red component of the pixels may be processed using the third look up table 415. For example, each one of the look up tables 411, 413 and 415 may include 1024 locations for storing 1024 elements of 13 bits each.

In accordance with another embodiment, a single look up table may be configured to include the elements of a transformation and further employed to simultaneously process the three color components R, G and B of pixels forming a single surface. In this embodiment, the look up tables 411, 413 and 415 would be replaced by a unique look up table to process the three color components of a pixel.

In one example, the plurality of pixels may be in grayscale format. Each pixel of the surface includes a single color component to be processed according to a transformation stored in a single look up table.

In the embodiment illustrated in FIG. 4, the transformation application circuit 30 includes N sets of three look up tables. Each set of three look up tables is referred to as $LUT_i$, where i is a number between 0 and N. For example, look up tables 411, 413 and 415 form the set $LUT_0$ of look up tables. In accordance with one embodiment, an image received from a graphics processing system comprises a set of pixels which are sent to each set of look-up tables, i.e. each pixel is sent to $LUT_0, LUT_1, \ldots, LUT_N$. In FIG. 4, the incoming pixel is in the RGB format and each individual color component 405, 407, 409 has 10 bits. In other embodiments, each color component of a pixel may be 8 bits, 10 bits, 13 bits, etc. In yet another embodiment, the color components may have different numbers of bits, such as 8 bits for Red, 8 bits for Blue, and 10 bits for Green. In the embodiment of FIG. 4, each color component is received in a separate look-up table. For example, each one of the look up tables 411, 413 and 415 may be configured to respectively process the red component, the green component and the blue component of a pixel. In another embodiment, unique look up tables $LUT_0, LUT_1, \ldots, LUT_N$ simultaneously process the three color components of a pixel.

A multiplexer 417 is used to selectively transmit a post-transformation pixel to a display device. The post-transformation pixel may be further processed before being sent to the display device. Examples of further processing are spatial digital gamma corrections, spatial digital luminance corrections, and pixel packing. Selection of the appropriate input of the multiplexer 417 to be sent to the output of the multiplexer 417 is done by the selection module 419. The selection module 419 is a hardware implemented module that receives the Alpha bits 403 of the incoming pixels and as a function of the position of the pixel in the image, will select the transformation to be applied, i.e. the appropriate look-up table to be used to process the incoming pixels. In another embodiment, the selection module 419 selects the transformation to be applied to a pixel according to its position in the image by selecting the output of the corresponding transformation module when the transformation module is an arithmetic circuit.

Figure 5:
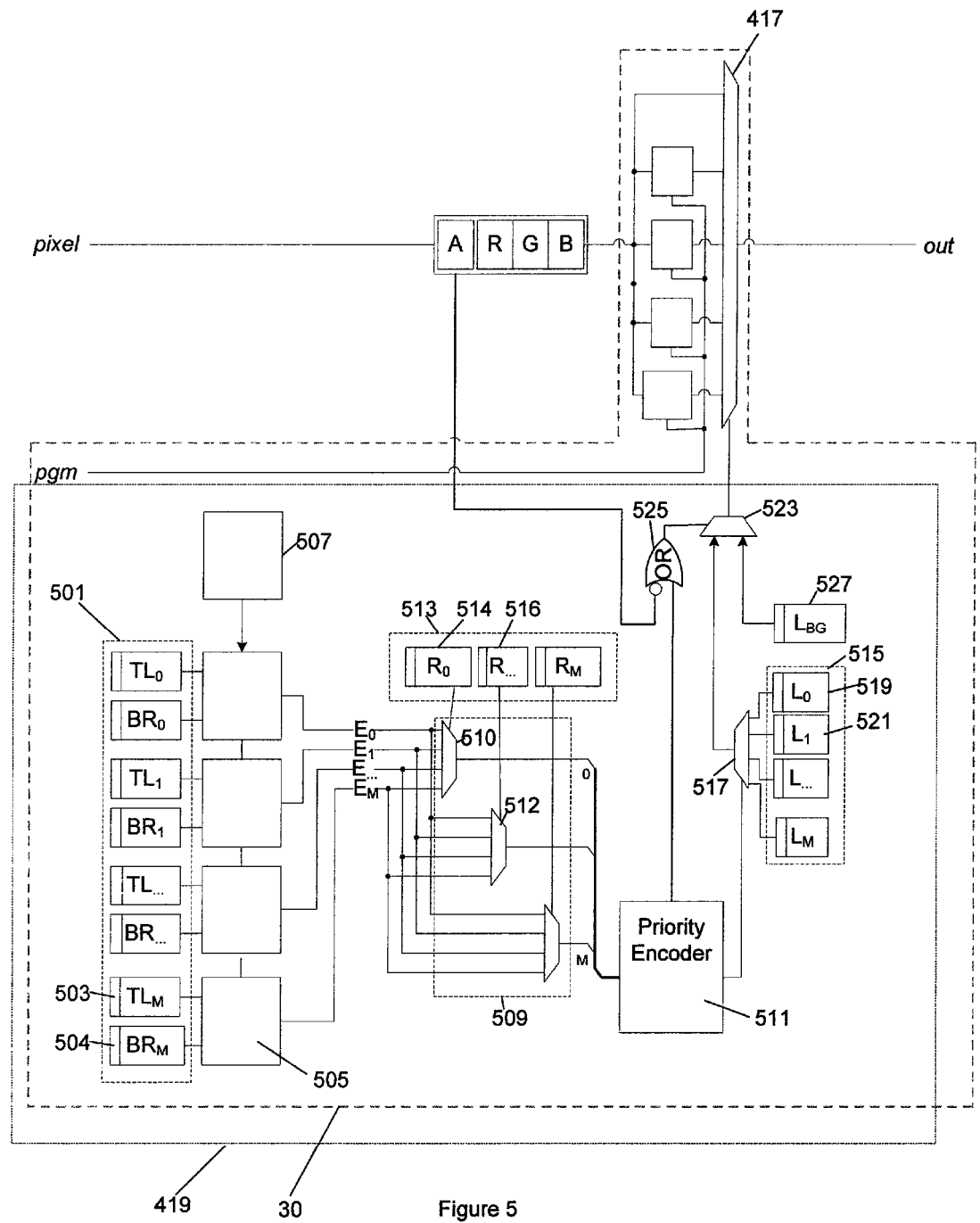
FIG. 5 illustrates the selection module in more detail, in accordance with one embodiment.

FIG. 5 illustrates one embodiment for a hardware implementation of the selection module 419. According to this embodiment, a set of Coordinate Registers 501 hold the coordinates $(x_0, y_0)$ and $(x_1, y_1)$ for each region $R_i$ (identified in FIG. 5 as $TL_i$ (top left coordinate for region I) and $BR_i$ (bottom left coordinate for region I)), whereby one register 503 is used for one set of coordinates and another register 504 is used for another set of coordinates. A set of M region identification modules 505 are connected to each pair of coordinate registers 503, 504. Horizontal and vertical counters 507 are connected to each one of the region identification modules 505 and are used to determine the position of a pixel received by the plurality of look up tables in the image coordinate system. In one embodiment, the horizontal and vertical counters 507 are synchronized with the h-synch, v-synch and clock signals of the received image. For example, the counters are initialized when receiving a v-synch, the horizontal counter is incremented at each clock signal and the vertical counter is incremented at receipt of a h-synch signal.

Each region identification module 505 determines if the received pixel belongs to the region defined by the values stored in the region identification module's coordinate registers 501. In this embodiment, each region identification module 505 compares the position of the received pixel with the values of its corresponding coordinate registers $TL_i$ and $BR_i$ and outputs a "1" or "0" depending on whether the position of the received pixel is within the region defined by the corresponding coordinates (outputs a "1") or outside of the region (outputs a "0"). The output from each region identification module 505 is sent to each one of a plurality of multiplexers 509.

A set of Region Priority Registers 513 are used to store the region IDs $R_N$ in order of their priority level. For example, in FIG. 5, the first register 514 stores the ID of the region having the highest priority level, the second register 516 stores the ID of the region having the second highest priority level, and so on. Each region priority register 513 is connected to a corresponding one of the multiplexers 509 and is used as its selector line. Each multiplexer 509 has all of the region identification module outputs as inputs. The first multiplexer 510 will send the input that corresponds to the ID of the region having the highest priority. For the example illustrated in FIG. 2, when a pixel belonging to Region 3 and to Region 1 is received in the plurality of look up tables, Region 3 has a priority of 0, which means that the third input line (or the fourth if the count starts at zero instead of at one) is sent to the output of the first multiplexer 510. The region having the second highest priority is $R_1$ and so the first input line (or the second if the count starts at zero instead of at one) is sent to the output of the second multiplexer 512. In one embodiment, the number of Priority Registers and the number of multiplexers corresponds to the number of regions in an image.

A priority encoder 511 comprises a plurality of inputs, each input connected to the output of the multiplexers 509. The priority encoder comprises two outputs, a first output connected to an OR gate 525 and a second output connected to a multiplexer 517. The priority encoder 511 receives all inputs from the multiplexers 509, i.e. it receives a series of "1" and "0" bits. The priority encoder 511 will identify the first "1" in order of priority and will output the priority level of the region for which the first "1" was received. For example, if the pixel position is within region 4, then the first "1" received by the Priority Encoder 511 will be for region 4, and the Priority Encoder 511 will output the priority of region 4, namely P:2. The priority level is then sent to the selector line of the multiplexer 517. This multiplexer 517 has as inputs a set of look-up table priority registers 515. The top register 519 stores the ID number of the look-up table for the region having the highest priority level; the second register 521 stores the number of the look-up table for the region having the second highest priority level, and so on. For example, in the image of FIG. 2, the region with the highest priority level is region 3 and the matching look-up table is $LUT_9$. Therefore $L_0$ stores the value "9". The region with the second highest priority level is region 1 and the matching look-up table is $LUT_3$. Therefore $L_1$ stores the value "3".

Continuing the previous example, region 4 has a priority level of 2 and corresponds to $LUT_6$. Therefore, when the Priority Encoder 511 outputs a "2" for a pixel found in region 4, the multiplexer 517 will send the contents of $L_2$ through to the output, which will be "6". A multiplexer 523 will selectively cause the multiplexer 417 to output one of its inputs. In the present case, the post-transformation pixel values found in $LUT_6$ are sent through the multiplexer 417 and to the output.

The multiplexer 523 has two inputs, a first input connected to the output of the multiplexer 517 and a second input connected to a look-up table background register 527. The look up table background register 527 includes the ID number of the look up table to be applied on pixels belonging to the background of the image. In one embodiment, the background is the set of pixels that are not part of any region. The multiplexer 523 receives a selection value from the OR gate 525 and outputs a value to the multiplexer 417 for selectively causing the multiplexer to output one of its inputs. In another embodiment, the background may be treated as simply another region of the image and additional circuitry for a unique look up table background register 527 is not provided.

The OR gate 525 is used as a selector for multiplexer 523. Its inputs are the inverse of at least one of the Alpha bits 403 of the incoming pixel and one of the outputs of the priority encoder. As per the principle of a standard OR gate, if at least one of the inputs is a "1", then the output is a "1". If both inputs are a "0", then the output is a "0". In the illustrated embodiment, if the value output from the OR gate 525 is "1" the multiplexer 523 chooses the value stored in the look up table background register 527 as output and if the value output from the OR gate 525 is "0", the multiplexer 523 chooses the value output by the multiplexer 517 as output.

For example, if the pixel being received in the transformation application circuit is part of the background of the image, the priority encoder receives only "0" at inputs, since the pixel is not part of any region, and sends a "1" to the OR gate 525. The output of the OR gate will select the value of the look up table background register 527 as output of the multiplexer 523. This value is sent to the multiplexer 417 and is used as a selector to output the post-transformation pixel from the look up table associated with the background of the image. Further, if the alpha value of the received pixel is "0", the OR gate 525 outputs a "1" and in the same manner the post-transformation pixel output from the multiplexer 417 corresponds to the processing of the pixel by the look up table associated to the background of the image. In this case, the pixel may be part of a region that is independent from the background but does not need to be processed according to the look up table associated with the region it belongs to. If the pixel belongs to a region that is not the background and a transformation is to be applied, the priority encoder 511 sends a "0" to the OR gate, and if the Alpha value of the pixel is "1", the output of the OR gate sent to the multiplexer 523 selects the output of the multiplexer 517 and sends the value of the selected look up table to the multiplexer 417.

In one embodiment, the look up table background register 527 may include a default value, such that when selected and sent to the multiplexer 417, this value indicates that none of the outputs of the look up tables $LUT_0$, $LUT_1$, . . . , $LUT_N$ should be selected by the multiplexer 417 and the received pixel should be output without being processed. This may define a "by-pass" mode, where the pixel is not processed by any of the transformations included in the look up tables.

Figure 6:
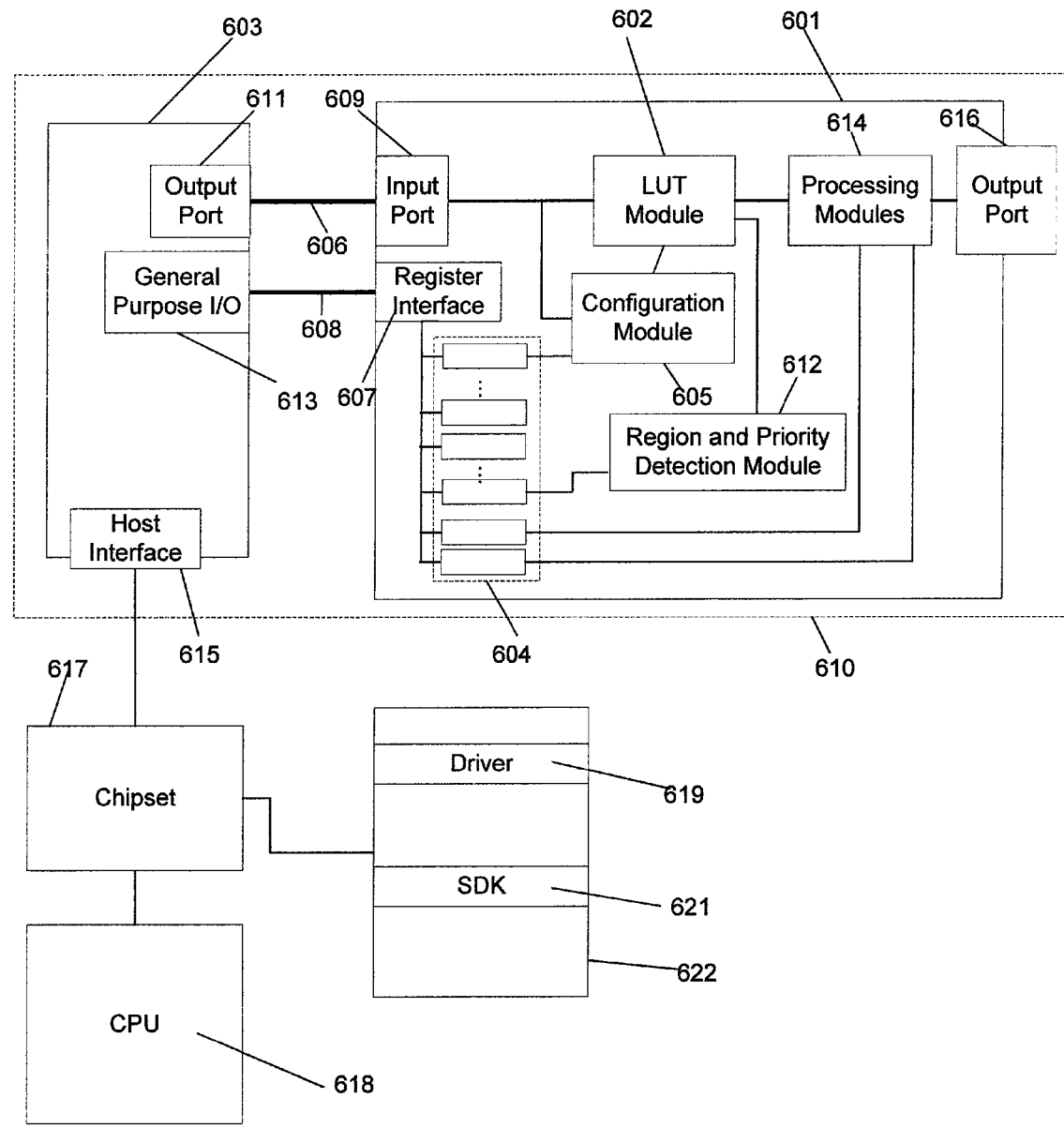
FIG. 6 illustrates a generic embodiment of a graphics system incorporating the transformation application circuit in an FPGA.

FIG. 6 illustrates a generic embodiment of the system with the transformation application circuit implemented. A Field Programmable Gate Array (FPGA) 601 is provided with a set of look-up tables included in a LUT module 602 and a set of registers 604, as per FIG. 5. A configuration module 605 is used to program the look-up tables with the appropriate transformations. A region and priority detection module 612 is used to send selection signals to the LUT module 602. The FPGA 601 communicates with a Graphics Processing Unit 603 via a digital video interface 606 between an input port 609 on the FPGA 601 and an output port 611 on the GPU 603. The digital video interface 606 is used to communicate data from the GPU 603 to the FPGA 601, the data including the pixels and accompanying signals, such as synchronization (Hsynch, Vsynch), display enable, and clock signals forming a displayable image. The pixels are sent directly to the look-up tables 602. As per FIG. 5, at least one of the Alpha bits of a pixel is sent to the selection module. The GPU 603 and FPGA 601 are also connected via a serial programmable interface 608 (e.g. I²C, SPI). The serial programmable interface is found between a general purpose I/O port 613 on the GPU 603 and a register interface 607 on the FPGA 601. A communication protocol is used to program the registers of the FPGA 601 via the register interface 607. In some embodiments, the FPGA 601 may include other processing modules connected to a plurality of registers from the set of registers 604 and to the LUT module 602 for further processing the incoming pixels before being output. Further, an output port 616 may be provided in the FPGA 601 and connected to the processing modules 614. In some embodiments, the output port 616 is connected to the LUT module 602.

The GPU 603 is connected to the rest of the system via a host interface 615 (e.g. PCI Express interface, which is a high-speed peripheral interconnect that can accommodate Gigabit and 10 Gigabit Ethernet and even support chip-to-chip transfers). A chipset 617, also known as a number of integrated circuits, packaged as one unit, which perform one or more related functions, is connected to the GPU 603 via the host interface 615. The chipset 617 is connected to a CPU 618 and to a memory 622. A driver 619, which provides the detailed instructions necessary to activate and control the graphics processing unit 603 and the FPGA 605, is also present and accessible within the memory 622. The driver 619 allows the operating system running on the CPU 618 to communicate with the graphics system 610, including the GPU 603 and the FPGA 601. A Software Development Kit (SDK) 621 is a set of development tools that allows an application running on the CPU 618 to use the functionalities of the FPGA 601. In the illustrated embodiment, the SDK 621 and the driver 619 program the FPGA through the serial programmable interface 608, the digital video interface 606 and the host interface 615.

Software (SDK 621 and the driver 619) is provided to dynamically reprogram the look-up tables and/or the selection module registers. Events are detected on the desktop that result in reprogramming. For example, when a region corresponds to an open window on a desktop and the window is displaced to a new position, the ($x_0$, $y_0$) and ($x_1$, $y_1$) coordinates have changed and the Coordinate Registers 501 must be updated accordingly. Another example is when priorities change, such as when a window that was previously in the foreground of the desktop is replaced by another window selected by the user. In this case, the priority registers 513 and the look-up table registers 515 are to be updated with the new priorities.

An example of a user using the system described herein will be described below. In one embodiment, the user is a doctor or technician analyzing x-rays on a monitor. On the monitor, there is a medical application open, a Mail application and a Word™ document. The user may want to use the medical application to view x-ray images and diagnose a patient's disease according to these images. In order to perform an accurate analysis, the user may want to open an x-ray image in the medical application and to highlight portions of the x-ray surface displayed in a region of the image shown on the monitor without transforming the entire image. In the present example, the user wishes to apply a transformation to the window including the x-ray surface without modifying the data displayed in the other windows. The user may also wish to open a plurality of x-ray surfaces and perform a different transformation on each surface to highlight different characteristics of the x-ray surfaces. In another example, the user may want to open a plurality of windows including the same x-ray surface and perform a different transformation on each window to highlight different characteristics of the same x-ray surface.

Figure 7:
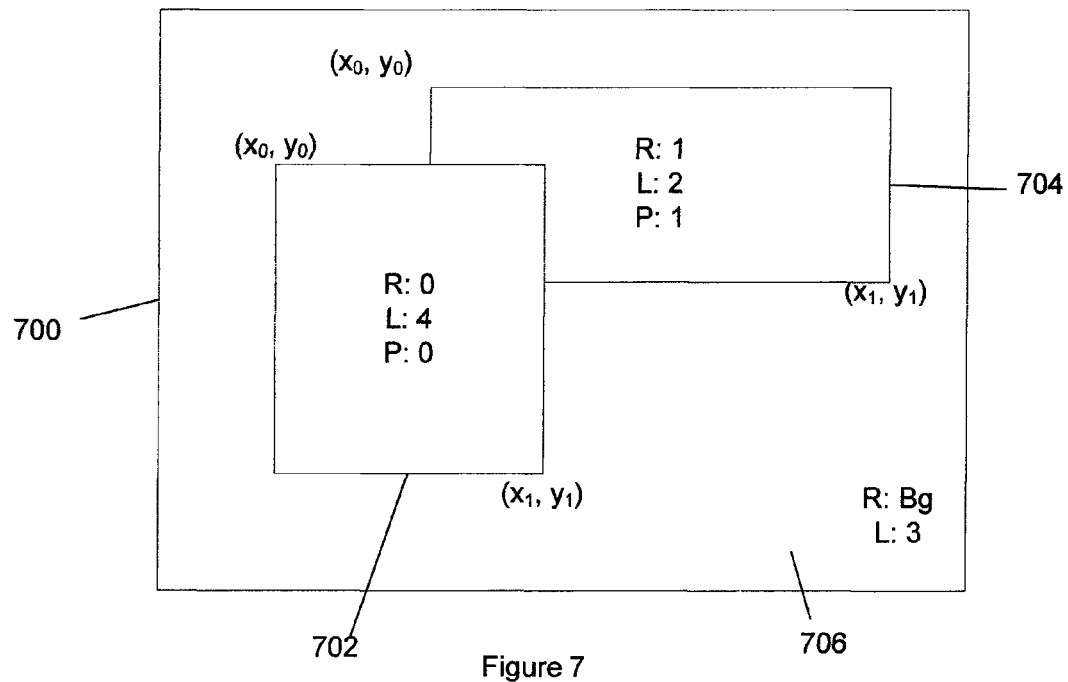
FIG. 7 illustrates an display device with an image having two regions defined therein, in accordance with one embodiment.

FIG. 7, illustrates an example of an image 700 displayed on a display device in use by a user. The image 700 may represent an entire desktop defined by the operating system running on the computer system, or it may be only a portion of the entire desktop. In this example, the user is using an application and opens a first region 702 and a second region 704 to view different x-ray images. In some embodiments, the operating system defines, for each region displayed on the desktop, a set of parameters such as the size of the region, the position of the region, etc. In general, the computer system defines a first transformation to be applied on the entire image 700. For example, the transformation may be a gamma correction, and may be either determined automatically or chosen by the user from a set of available gamma corrections. In this example, the transformation to be applied on the entire image is referred to as $LUT_2$ (L:3). The user may want to apply a different transformation on the region 702 which may include an x-ray surface and another transformation on the region 704. The application may provide the user with a set of transformations from which to choose an appropriate one. In the illustrated example, the user chooses to apply the transformation referred to as $LUT_4$ (L:4) to the region 702 and $LUT_2$ (L:2) to the region 704.

According to one embodiment, when the user requests the creation of the region 702, in a first step the application and the operating system determine the parameters of the region 702. In a following step, the application records the region 702 using the SDK 621 as a region to be processed according to a transformation in the FPGA 601. The region 702 is added to a list of previously recorded regions. In order to record the region, the SDK 621 assigns a region ID $R_o$ (R:0) to the region 702, computes the priority level of the region 702 according to the priority levels of all previously recorded regions and associated the corresponding transformation $LUT_4$ to the region. For example, if the region 704 was previously defined by the application and the SDK 621, the priority levels are computed consequently. In another step the application requests the display of the data opened in the region 702 and uses the SDK 621 and the driver 619 to update the data displayed in the region 702. In this step, the SDK updates the alpha values of the pixels of the region such that when the transformation application circuit processes the pixels the appropriate transformation is applied. The user uses the application to select the transformation $LUT_4$ (L:4) to process the pixels of the region 702.

Referring now to FIG. 6, the application uses the SDK 621 and the driver 619 to program the GPU 603 and the FPGA 601 to process the pixels of the regions according to the different transformations. For example, the driver 619 may allow the application and the operating system to use the host interface 615, the general purpose I/O 613 and the output port 611 of the graphics processing unit 603 to transfer the transformation data to the appropriate look up table in the LUT module 602. Further, the driver 619 may allow the output port 611 of the GPU 603 to transfer the plurality of pixels of the entire image 700 to the FPGA 601. The SDK 621 is used by the application to configure the FPGA 601 so that each pixel of the image 700 is processed using the appropriate look up table according to the region it belongs to and according to the priority of the region. In this example, the priority level of region 702 is 0 and the priority level of region 704 is 1. The SDK 621 configures the FPGA 601 such that a pixel belonging jointly to regions 702 and 704 is processed using $LUT_4$ since region 702 has a higher priority level.

Figure 8:
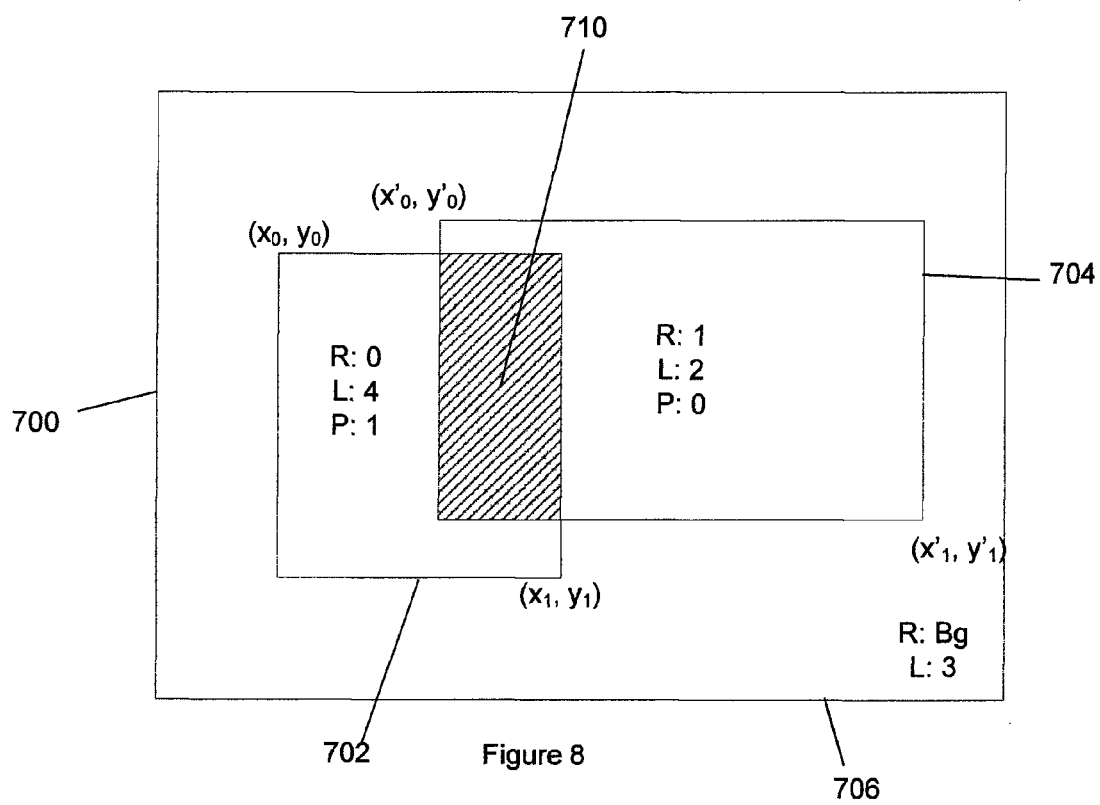
FIG. 8 illustrates the image of FIG. 7 with the priorities and the sizes of the regions modified, in accordance with one embodiment.

The user may want to display the modified region 704 in the foreground (i.e. on top of all other regions). In this case, the SDK 621 detects the changes performed by the user on the region 704 and updates the FPGA 601 with new parameters through the driver 619. As shown in FIG. 8, the priority level of the region 704 is changed to 0 and the priority level of the region 702 is changed to 1. In this example, the user also changes the size and position of the region 704, consequently modifying the coordinates of the region, the new coordinate being now $(x'_0,y'_0)$ and $(x'_1,y'_1)$. The SDK 621 detects these changes and updates the registers initially including the coordinates of the region 704 and the priority registers of the FPGA 601 such that the region 704 is associated with the priority level 0 and the region 702 is associated with the priority level 1. All pixels 710 belonging jointly to region 704 and region 702 will now be processed using $LUT_2$ before being displayed on the display device. All pixels belonging to the region 702 and not to the region 704 are processed using the $LUT_4$. All pixels belonging to the region 704 are processed using the $LUT_2$. All other pixels of the image are processing using the $LUT_2$. In one embodiment, the registers of the FPGA 601 may be double-buffered and may be updated in synchronization with the v-synch signal (indicating the end of a displayed image), such that each displayed image is processed according to the appropriate transformations.

The user may also use the application to modify the transformation applied to one of the regions. The application uses the SDK 621 and the driver 619 to configure the FPGA 601 to associate a new look up table from the LUT module 602 to a region. If the transformation is not included in any of the look up tables of the LUT module 602, the SDK 621 and the driver 619 may program the look up table with the appropriate new transformation before processing the region. In one embodiment, the elements of the transformation are sent to the FPGA 601 from the GPU 603 through the digital video interface 606. In this embodiment, at least one of the registers 604 is programmed with a value, indicating to the configuration module that the data input at the input port 609 and sent to the LUT module 602 is configuration data. The configuration module 605 uses the configuration data to program the look up table with the appropriate transformation. In some embodiments, the transformation is configured in three look up tables, each one used to process a color component of a pixel (e.g. R, G and B). Once the look up tables are configured with the appropriate transformation, the image to be displayed on the display device is sent through the digital video interface 606 to be processed by the FPGA 601. In another embodiment, the graphics processing unit 603 may be configured to transfer to the FPGA 601 the configuration data and the image to be displayed on the display device as visible image data using the digital video interface. For example, the graphics processing unit may use a determined number of lines of the visible region of the image to send configuration data. The SDK is used to configure at least one of the registers 604 with the number of lines such that the configuration module 605 uses the data of those lines to program the look up tables of the LUT module 602 and uses the rest of the image data as displayable pixels to be processed by the Look up tables.

In one embodiment, each region corresponds to a window open by an application. The window is associated with a window ID, a transformation and a priority level. Furthermore, for each window, the coordinates defined by the application using the SDK 621 to configure the region registers in the FPGA 601 correspond to coordinates of a central region of the window referred to as the drawing area of the window. The drawing area of a window is its central region excluding its border which may include toolbars, scrollbars etc. In some embodiments, an application may open a plurality of windows and each window may be associated with a different transformation.

In some embodiments, the operating system or an application running on the computer system of the user may display a message box on top of all running applications. In general the pixels included in the message box need to be processed according to a transformation applied on the background of the image or does not need to be processed at all before being displayed. In some operating systems, the message box may not be associated to region parameters and the SDK 621 and the driver 619 may not be used to configure the FPGA 601 to process the pixels of the message box with the appropriate transformation.

Referring now to FIG. 5, for each pixel of the message box, one of the bits of its alpha value is set to "0" by the driver. Since the alpha value of the pixel is set to "0", even if the priority encoder 511 sends a "0" to the OR gate (indicating that the pixel is not part of the background and should be processed using the LUT table associated with the highest priority region comprising the pixel), the output of the OR gate 515 selects the value of the register 527 to send to the multiplexer 417 which selects the look up table processing the background of the image.

In general, the alpha value may be used to exclude a pixel belonging to a given region from being processed by the look up table associated with that region and therefore force the transformation circuit to process the pixel according to the transformation associated with the background. For example, the operating system or the SDK may set the alpha values of some pixels of a region to "1" while setting the alpha value of other pixels of the same region to "0".

Figure 9:
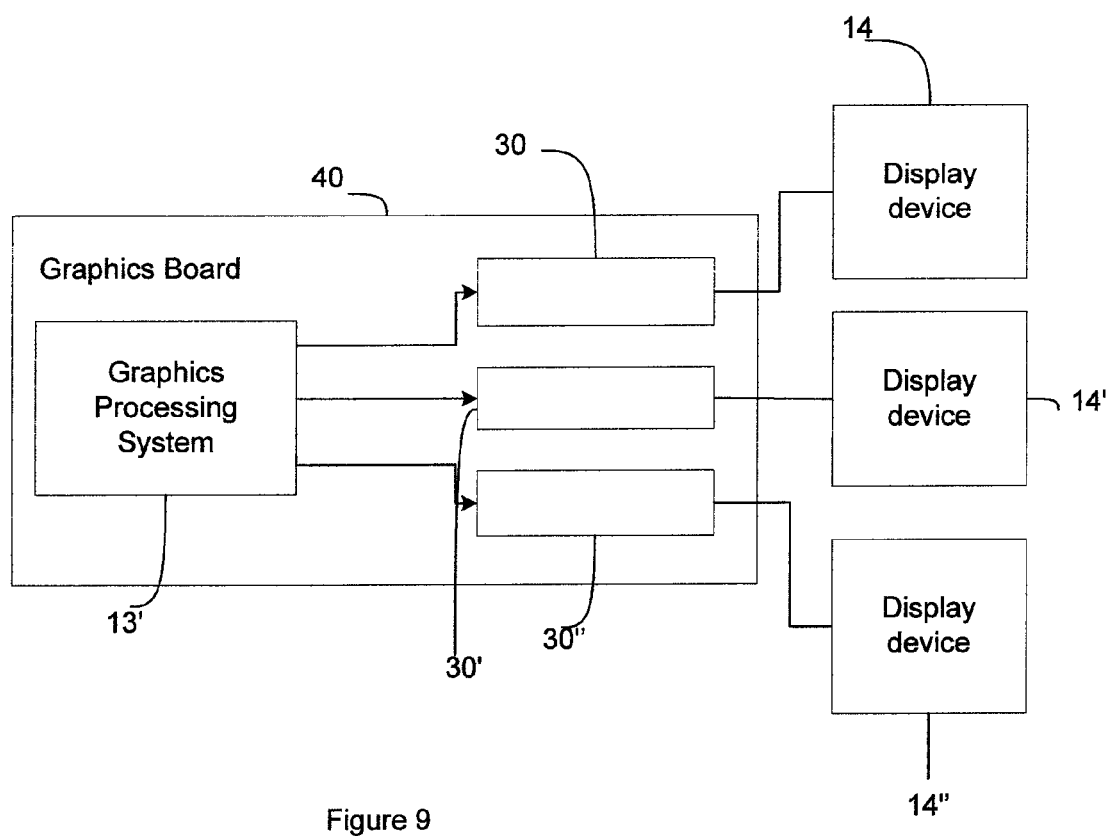
FIG. 9 illustrates a graphics board with a single graphics processing system and multiple transformation circuits, in accordance with one embodiment.

FIG. 9 illustrates a system where multiple display devices 14, 14', 14" are used with a single graphics board 40 according to one embodiment. The graphics board 40 includes a graphics processing system 13' connected to three transformation application circuits 30, 30' and 30". The graphics board may include other components not shown in the figure, such as a host interface (ex. PCI Express interface), a plurality of output ports included in the graphics processing system, a plurality of output ports connected to the outputs of the transformation application circuits, digital to analog converters and other processing modules. For each display device 14, 14', 14", a transformation application circuit 30, 30', 30" is provided. In this embodiment, the graphics processing system 13' is adapted to generate images for display on each one of the three display devices. In one embodiment, the graphics processing system 13' may be configured to display a desktop image stretched on the three display devices 14, 14' and 14". In another embodiment, the graphics processing system may be configured to display independent desktop images on the three display devices. In some other embodiments, the graphics processing system may be configured to display the same desktop image on the three display devices.

In one embodiment, the graphics board is connected to a computer system running an operating system and the graphics processing system 13' is configured to display a desktop image stretched on the three display devices 14, 14' and 14". In this embodiment, the operating system and an application define a set of parameters according to the entire desktop as stretched over the three display devices for each region open on the desktop. The SDK 621 is adapted to receive these parameters and translate them into "local" parameters that may be used to independently configure each transformation application circuit 30, 30' and 30". For example, the 621 receives coordinates of a region defined in a desktop coordinate system and transforms them into coordinates in an image coordinate system appropriate for the display device displaying the region. In some examples, the region may be displayed on at least two display devices. The SDK 621 receives the desktop coordinates of the entire region and determines a first set of coordinates of a first sub-region displayed on a first display device and a second set of coordinates of a second sub-region displayed on a second display device. The first set of coordinates is used to configure a first transformation application circuit to process the first sub-region and the second set of coordinates is used to configure a second transformation application circuit to process the second sub-region.

While illustrated in the block diagrams as groups of discrete components communicating with each other via distinct data signal connections, it will be understood by those skilled in the art that the preferred embodiments are provided by a combination of hardware and software components, with some components being implemented by a given function or operation of a hardware or software system, and many of the data paths illustrated being implemented by data communication within a computer application or operating system. The structure illustrated is thus provided for efficiency of teaching the present preferred embodiment. The embodiments of the invention described above are intended to be exemplary only. The scope of the invention is therefore intended to be limited solely by the scope of the appended claims.

The invention claimed is:

1. A circuit for independently processing a plurality of regions of an image to be displayed on a display device, the circuit comprising:
   a plurality of transformation modules, each one of said transformation modules having an input for receiving a pixel output from a graphics processing system and forming part of said image, and an output for transmitting a transformed pixel, each one of said transformation modules determining an output value for said transformed pixel;
   a multiplexer having a plurality of inputs, each one of said inputs connected to a corresponding output of said plurality of transformation modules, an output for selectively transmitting the transformed pixel from one of said plurality of transformation modules, and a selector line; and
   a selection module operatively connected to said selector line of said multiplexer and configured to cause the multiplexer to output the transformed pixel from one of the plurality of transformation modules as a function of a position of the pixel in the image, at least one region comprising the position, a priority level associated with each region, and a transformation associated with the region of a highest priority level.

2. A circuit as claimed in claim 1, wherein said transformation modules are look-up tables.

3. A circuit as claimed in claim 1, wherein each one of said transformation modules is a set of three look up tables and each one of the three look up tables is configured to process a color component of a multi-component pixel.

4. A circuit as claimed in claim 1, wherein said selection module is configured to bypass said plurality of transformation modules when no transformation is to be applied to a given pixel.

5. A circuit as claimed in claim 2, wherein said plurality of look-up tables, said multiplexer, and said selection module are implemented in a Field Programmable Gate Array, and said Field Programmable Gate Array receives said image from the graphics processing system.

6. A circuit as claimed in claim 1, wherein said selection module comprises control circuitry for receiving configuration parameters identifying said regions of said image, said parameters comprising the boundary of each region, the priority of each region and the position of each region.

7. A circuit as claimed in claim 1, wherein said plurality of transformation modules are individually configurable with appropriate parameters of a transformation.

8. A circuit as claimed in claim 6, wherein said circuit is configured to receive a first image comprising a first plurality of regions and a second image comprising a second plurality of regions, and said control circuitry of said selection module is first programmed with parameters of the first plurality of regions to process the first image and said control circuitry is reprogrammed with parameters of the second plurality of regions to process the second image.

9. A circuit as claimed in claim 1, further comprising a detection module for dynamically detecting events on a desktop comprising said image and configuring said transformation modules and said selection module with new parameters.

10. A circuit as claimed in claim 9, wherein said detection module is implemented in software.

11. A circuit as claimed in claim 8, further comprising a detection module for dynamically detecting events on a desktop comprising said image and configuring said transformation modules and said control circuitry of said selection module with parameters of the second plurality of regions to process the second image.

12. A circuit as claimed in claim 1, wherein said selection module comprises:
   a plurality of coordinate registers storing coordinates for each one of said plurality of regions;
   a plurality of priority registers storing a region ID for each priority level;
   a plurality of transformation module registers storing a transformation module ID for each priority level; and
   multiplexer circuitry operatively connected to said plurality of coordinate registers, to said plurality of priority registers and to said plurality of transformation module registers, said multiplexer circuitry identifying a transformation module corresponding to a selected region determined according to values stored in the plurality of registers and causing said multiplexer to output said output value from the identified transformation module as the transformed pixel for display on the display device.

13. A method for independently processing a plurality of regions of an image to be displayed on a display device, the method comprising:
   receiving a pixel output from a graphics processing system and forming part of said image in a plurality of transformation modules;
   outputting from said plurality of transformation modules an output value for a transformed pixel;
   identifying a transformation module associated with a region corresponding to a highest priority level for a pixel position as a function of a position of the pixel in the image, at least one region comprising the position, a priority level associated with each region, and a transformation associated with the region of the highest priority level; and
   transmitting the output of the transformation module associated with said region corresponding to the highest priority level to a display device by multiplexing the outputs from said plurality of transformation modules using said selection module as a selector signal.

14. A method as claimed in claim 13, further comprising dynamically detecting events on a desktop displayed on said display device and configuring said transformation modules and said hardware selection module with new parameters to display an updated desktop on said display device.

15. A method as claimed in claim 14, wherein said events are selected from a group comprising a region size modification, a change in region location, and a change in region priority level.

16. A method as claimed in claim 13, wherein said transformation modules are look-up tables.

17. A method as claimed in claim 13, wherein each one of said transformation modules comprises a first look up table, a second look up table and a third look up table, said pixel comprises a first color component, a second color component and a third color component, and said receiving a pixel comprises:
 receiving the first color component of said pixel in said first look up table of each one of the plurality of transformation modules;
 receiving the second color component of said pixel in said second look up table of each one of the plurality of transformation modules; and
 receiving the third color component of said pixel in said third look up table of each one of the plurality of transformation modules.

18. A method as claimed in claim 13, further comprising configuring said hardware selection module as follows:
 storing in a plurality of coordinate registers coordinates for each one of said plurality of regions;
 storing in a plurality of priority registers a region ID for each priority level; and
 storing in a plurality of transformation module registers a transformation module ID for each priority level.

19. A method as claimed in claim 13, further comprising configuring each one of said plurality of transformation modules with parameters of at least one transformation.

20. A method as claimed in claim 13, further comprising bypassing said plurality of transformation modules when no transformation is to be applied to a given pixel.

21. A method as claimed in claim 13, wherein said image is received from a digital video output port of the graphics processing system.

22. A method for independently processing a plurality of regions of an image to be displayed on a display device, the method comprising:
 defining a new region of said image;
 recording said new region in a list of regions to be processed by a transformation application circuit external to a graphics processing system and providing region parameters corresponding to said new region in said transformation application circuit, the transformation application circuit comprising a plurality of transformation modules;
 monitoring changes in said region parameters comprising changes in a position of a pixel in the new region, a priority level associated with the new region and a transformation associated with the new region; and
 updating said transformation application circuit for processing said new region according to said changes in said region parameters and for transmitting an output associated with the new region to a display device by multiplexing the outputs from the plurality of transformation modules when the priority level associated with the new region corresponds to a highest priority level.

23. A method as claimed in claim 22, wherein said recording said new region comprises:
 assigning an ID to said new region;
 determining the priority level of said new region in accordance with priority levels of previously defined regions of said image;
 associating said new region to a transformation of the transformation application circuit for processing said new region;
 determining a location of said new region in said image; and
 programming said transformation application circuit with the region ID, the location and the priority level of said new region, such that each pixel of said image is processed according to its position in said image, the priority levels of said regions of said image and the transformation associated with each region.

24. A method as claimed in claim 23, wherein said image is a portion of a desktop displayed on a display device, said new region is a window opened on the desktop and said location of the window is defined by the location of a drawing area of said window.

* * * * *